US011125253B2

(12) United States Patent
Alexander et al.

(10) Patent No.: US 11,125,253 B2
(45) Date of Patent: Sep. 21, 2021

(54) PNEUMATIC ARTICULATING STRUCTURE SYSTEM WITH INTERNAL TILE ARCHITECTURE

(71) Applicant: GM GLOBAL TECHNOLOGY OPERATIONS LLC, Detroit, MI (US)

(72) Inventors: Paul W Alexander, Ypsilanti, MI (US); Wonhee M Kim, Royal Oak, MI (US); Jonathan E. Luntz, Ann Arbor, MI (US); Diann Brei, Milford, MI (US); Koray Benli, Ann Arbor, MI (US); Tiantian Li, Ann Arbor, MI (US); Laura Alejandra Giner Munoz, Ann Arbor, MI (US); Jeff E Nasca, Bloomfield Township, MI (US); Nancy L Johnson, Northville, MI (US); Paul E Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 16/564,777

(22) Filed: Sep. 9, 2019

(65) Prior Publication Data
US 2021/0071690 A1    Mar. 11, 2021

(51) Int. Cl.
*F15B 15/10* (2006.01)
*B62D 35/00* (2006.01)

(52) U.S. Cl.
CPC ............. *F15B 15/10* (2013.01); *B62D 35/00* (2013.01)

(58) Field of Classification Search
CPC . F15B 15/10; F15B 15/103; B25J 9/14; B25J 17/00
See application file for complete search history.

(56) References Cited

U.S. PATENT DOCUMENTS
2017/0036355 A1*  2/2017  Lessing .................... B25J 9/142

FOREIGN PATENT DOCUMENTS
WO    WO-2018175744 A1 *  9/2018  ............. B25J 9/142

* cited by examiner

*Primary Examiner* — Abiy Teka
*Assistant Examiner* — Daniel S Collins
(74) *Attorney, Agent, or Firm* — Cantor Colburn LLP

(57) ABSTRACT

A pneumatic articulating structure includes a plurality of tiles, a flexible cover, and a plurality of resiliently flexible hinges. Each tile has a first surface and a second surface facing in opposite outward directions. An area of at least one respective first surface is greater than an area of at least one respective second surface. The cover is constructed to cover the tiles. The second surface of each one of the tiles is attached to the cover. Each tile is engaged to an adjacent tile by a respective hinge, and are proximate to the first surface. A vacuum chamber is define by at least the plurality of tiles and the flexible cover.

8 Claims, 5 Drawing Sheets

PNEUMATIC ARTICULATING STRUCTURE SYSTEM WITH INTERNAL TILE ARCHITECTURE

INTRODUCTION

The subject disclosure relates to an articulating structure, and more particularly, to a pneumatic articulating structure.

A wide array of structures, assemblies, and devices may, for example, include undesirable gaps, or clearances, that may contribute toward poor aerodynamics, wind noise, ingress of unwanted debris, and other undesirable occurrences depending upon the application. In some applications, the gaps, or clearances may be needed during certain operating scenarios, but unwanted during others.

Accordingly, it is desirable to provide an articulating structure that can cover and/or uncover gaps and/or clearances upon demand.

SUMMARY

In accordance with one, exemplary, embodiment of the present disclosure, a pneumatic articulating structure includes a plurality of tiles, a flexible cover, and a plurality of resiliently flexible hinges. Each tile has a first surface and a second surface facing in opposite outward directions. An area of the first surface of at least a respective one of the plurality of tiles is greater than an area of the second surface of at least a respective one of the plurality of tiles. The cover is constructed to cover the tiles. The second surface of each one of the tiles is attached to the cover. Each tile is engaged to an adjacent tile by a respective hinge, and are proximate to the first surface. A vacuum chamber is defined by at least the plurality of tiles and the flexible cover.

In addition to the foregoing embodiment, the pneumatic articulating structure includes a bladder. The plurality of resiliently flexible hinges and the flexible cover are part of the bladder. The plurality of tiles are in the bladder, and the first surfaces are attached to the bladder.

In the alternative or additionally thereto, in the foregoing embodiment, an opening is provided in the bladder for the flow of air.

In the alternative or additionally thereto, in the foregoing embodiment, the plurality of hinges are adapted to flex upon application of a vacuum in the chamber.

In the alternative or additionally thereto, in the foregoing embodiment, the pneumatic articulating structure includes an inflatable layer proximate to, and engaged to, the first surfaces of the plurality of tiles.

In the alternative or additionally thereto, in the foregoing embodiment, the inflatable layer defines a plurality of air pockets constructed to receive positive are pressure, and wherein each air pocket is proximate to a respective hinge of the plurality of resiliently flexible hinges.

In the alternative or additionally thereto, in the foregoing embodiment, the plurality of tiles are biased toward a first direction upon application of a vacuum in the chamber, and are biased toward a substantially opposite second direction upon application of a positive pressure in the inflatable layer.

In the alternative or additionally thereto, in the foregoing embodiment, each tile of the plurality of tiles have a T-shaped cross section including first, second, and third legs.

In the alternative or additionally thereto, in the foregoing embodiment, the first leg includes an end portion that carries the second surface and the second and third legs carry the first surface.

In the alternative or additionally thereto, in the foregoing embodiment, the plurality of tiles are elongated and aligned side-by-side.

In the alternative or additionally thereto, in the foregoing embodiment, the first surface spans laterally between end portions of the respective second and third legs.

In the alternative or additionally thereto, in the foregoing embodiment, the end portions of the first and second legs are chamfered toward the first leg.

In the alternative or additionally thereto, in the foregoing embodiment, the pneumatic articulating structure is a windshield cowling.

A pneumatic articulating structure according to another, non-limiting, embodiment includes a plurality of tiles, a flexible bladder and an inflatable layer. Each tile of the plurality of tiles has a first surface and a second surface facing in opposite outward directions. The flexible bladder includes a first and second side walls defining a chamber. The plurality of tiles are in the chamber, the first surfaces are attached to the first sidewall, and the second surfaces are attached to the second sidewall. The second sidewall includes a plurality of resiliently flexible hinges. Each tile of the plurality of tiles are spaced from, and engaged to, an adjacent tile by a respective resiliently flexible hinge of the plurality of resiliently flexible hinges. The inflatable layer is engaged to the second sidewall, and is adjacent to the plurality of resiliently flexible hinges.

Additionally to the foregoing embodiment, an opening is provided in the bladder for the flow of air into and out of the chamber.

In the alternative or additionally thereto, in the foregoing embodiment, the plurality of hinges are adapted to flex upon application of a vacuum in the chamber.

In the alternative or additionally thereto, in the foregoing embodiment, the inflatable layer defines a plurality of air pockets constructed to receive positive are pressure, and wherein each air pocket is proximate to a respective hinge of the plurality of resiliently flexible hinges.

In the alternative or additionally thereto, in the foregoing embodiment, the plurality of tiles are biased toward a first direction upon application of a vacuum in the chamber, and are biased toward a substantially opposite second direction upon application of a positive pressure in the inflatable layer.

A pneumatic articulating structure system according to another, non-limiting, embodiment includes a plurality of tiles, a flexible bladder, a heater, and an air pump. Each tile of the plurality of tiles has a first surface and a second surface facing in opposite outward directions. The flexible bladder includes opposite first and second side walls defining a chamber. The plurality of tiles are in the chamber, the first surfaces are attached to the first sidewall, and the second surfaces are attached to the second sidewall. The second sidewall includes a plurality of resiliently flexible hinges. Each tile of the plurality of tiles is spaced from, and engaged to, an adjacent tile by a respective resiliently flexible hinge of the plurality of resiliently flexible hinges. The heater is adapted to heat air. The air pump facilitates the flow of heated air at a positive pressure into the chamber when the chamber is not under vacuum.

Additionally to the foregoing embodiment, the pneumatic articulating structure includes a controller and an inflatable layer. The controller is configured to control the air pump and the heater. The inflatable layer is engaged to the second sidewall, and is adjacent to the plurality of resiliently flexible hinges.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
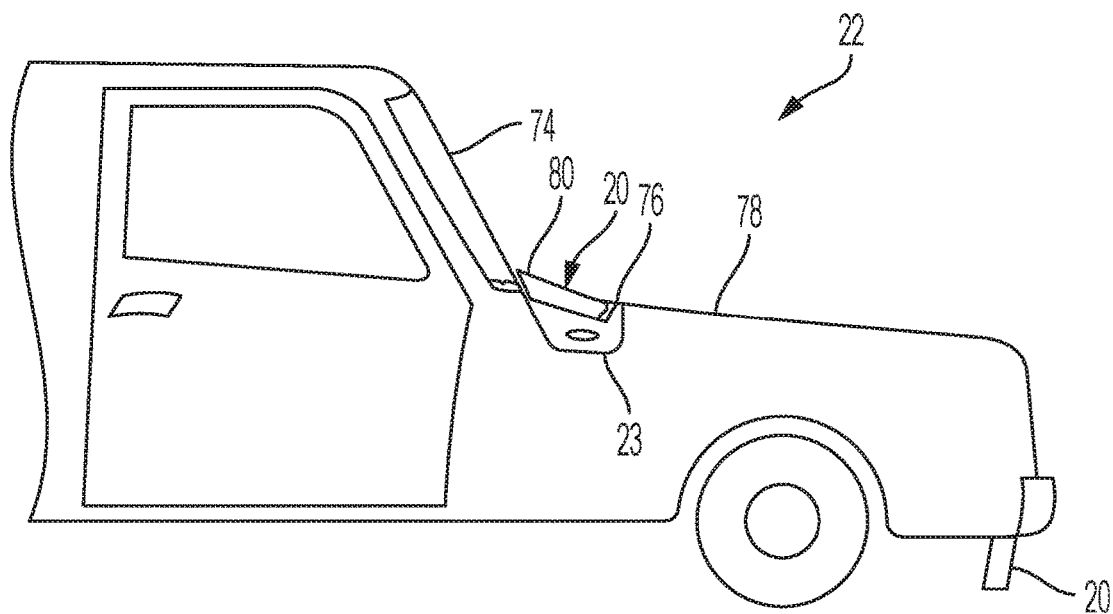
FIG. 1 is a partial side view of a vehicle illustrating applications of a pneumatic articulating structure according to the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates the application of a pneumatic articulating structure 20 (i.e., pneumatically actuated) on a vehicle 22. In one non-limiting example, the articulating structure 20 may be a vehicle cowl. The cowl may be used as a deployable, lower, air dam for improvement of highway fuel economy, and/or as a wind cowling to cover windshield wipers 23 when not in use.

Figure 2:
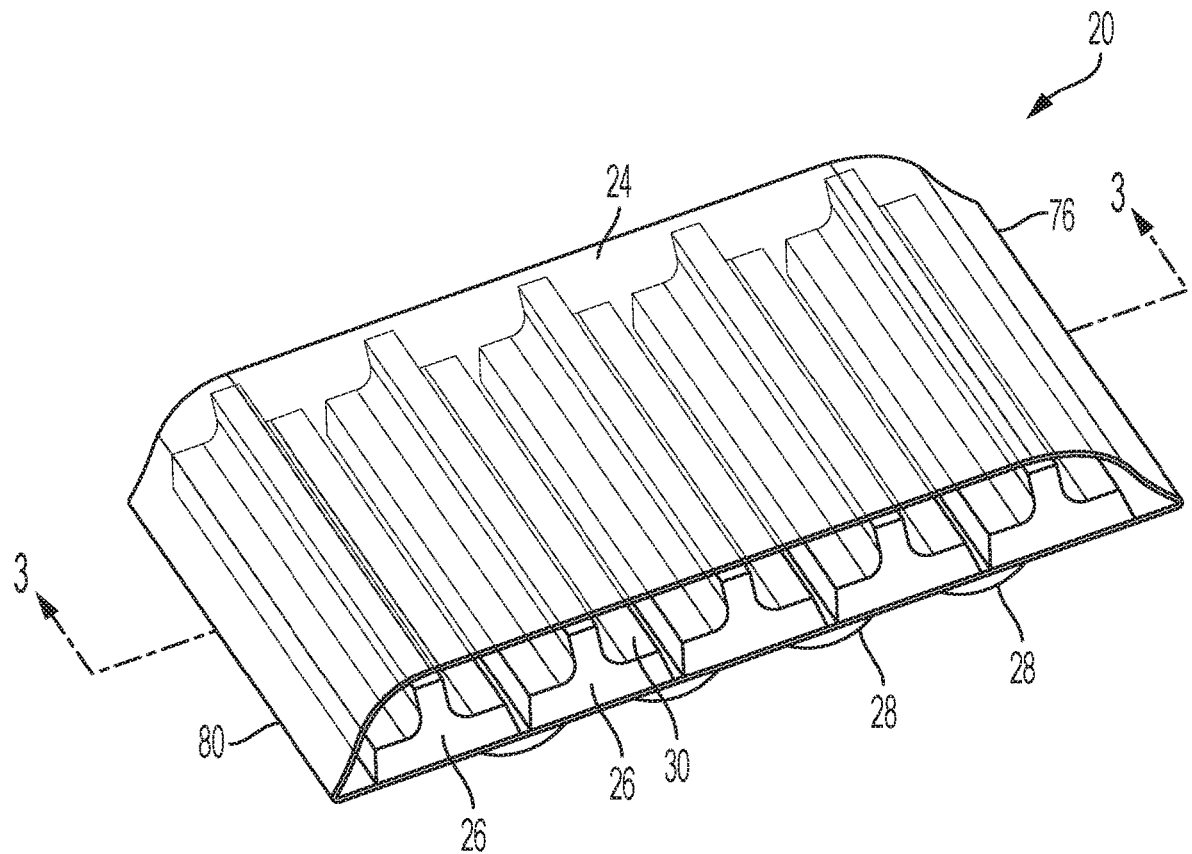
FIG. 2 is a cross-sectional perspective view of the pneumatic articulating structure illustrating a first side.
Figure 3:
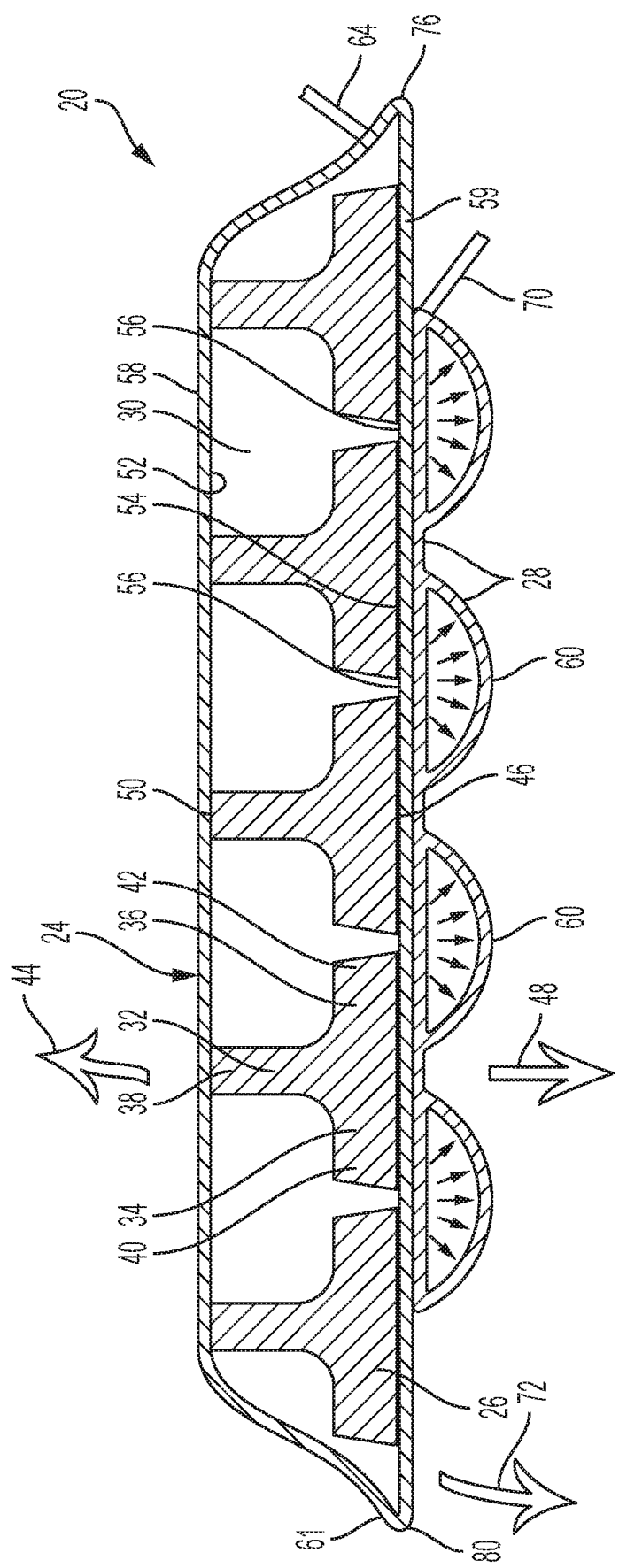
FIG. 3 is a cross section of the pneumatic articulating structure generally illustrated in a biased state.

Referring to FIGS. 2 and 3, and in an embodiment, the articulating structure 20 is adapted to flex, curl, or otherwise change shape, upon application of a vacuum pressure, and returns to an initial position upon release of the vacuum and application of a positive pressure. The articulating structure 20 may include a bladder 24, a plurality of tiles 26, and an inflatable layer 28. The bladder 24 may define a chamber 30 (e.g., vacuum chamber) with the plurality of tiles 26 located in the chamber 30. The bladder 24 is flexible, and in one example, is made of a nylon woven material impregnated with thermoplastic urethane.

Each tile of the plurality of tiles 26 is elongated and aligned side-by-side with the next adjacent tile. The tiles 26 each have a T-shaped cross section, and include first, second, and third legs 32, 34, 36 each including respective end portions 38, 40, 42. The first leg 32 is generally attached to, and projects outward from, the second and third legs 34, 36 between the end portions 40, 42. The projection of the first leg 32 is in a direction (see arrow 44 in FIG. 3) that may be substantially normal to the second and third legs 34, 36.

The bladder 24 may include a first sidewall 58 (e.g., cover), and a second sidewall 59. The sidewalls 58, 59 are attached to one-another at a common, continuous, and sealed, perimeter 61. The sidewalls 58, 59 carry respective inner faces 52, 54 that oppose one-another, and in an embodiment, may generally define the chamber 30.

The second and third legs 34, 36 are generally planar to one another and carry a common surface 46 that generally faces outward and in a direction (see arrow 48). Direction 44 is substantially opposite to direction 48. The end portion 38 of the first leg 32 carries a surface 50 that faces substantially outward and in the direction 44. The surface 50 of the first leg 32 includes an area that is substantially less than an area of the surface 46 carried by the second and third legs 34, 36. In an embodiment, the end portions 40, 42 of the respective second and third legs 34, 36 are each chamfered inwardly (i.e., toward the first leg 32 and along direction 44).

In an embodiment, the surface 50 of the first leg 32 of each tile 26 is adhered to, or otherwise attached to, the inner face 52 of the first side 58 of the bladder 24. Similarly, the surface 46 carried by the second and third legs 34, 36 is adhered to, or otherwise attached to, the opposite inner face 54 of the second side 59 of the bladder 24. In another embodiment, the surfaces 50 of the tiles 26 may not be attached to the bladder 24, or only some of the surfaces 50 may be attached, depending upon the desired control and positioning of the articulating structure 20 when actuated.

The articulating structure 20 includes a plurality of hinges 56 that may be resiliently flexible. Each hinge 56 may be elongated, is disposed between adjacent tiles 26, and is attached to the end portion 42 of a first tile 26 and an adjacent end portion 40 of an adjacent tile 26. In an embodiment, the plurality of hinges 56 are an integral part of the second side 59 of the bladder 24 that carries the face 54.

In another embodiment, the plurality of hinges 56 are an integral part of the plurality of tiles 26. For example, the plurality of tiles 26 and the plurality of hinges 56 may be one unitary, homogeneous, piece, and may be made of a flexible injection molded plastic. In this embodiment, the bladder 24 may only include the first side 58 (i.e., acts as a cover) that carries the face 52. More specifically, the vacuum chamber 30 is defined by the face 52 of the cover 58, the tiles 26, and the hinges 56 (i.e., integral to the tiles). The tiles 26 are generally rigid with respect to the flexibility of the hinges 56.

Figure 4:
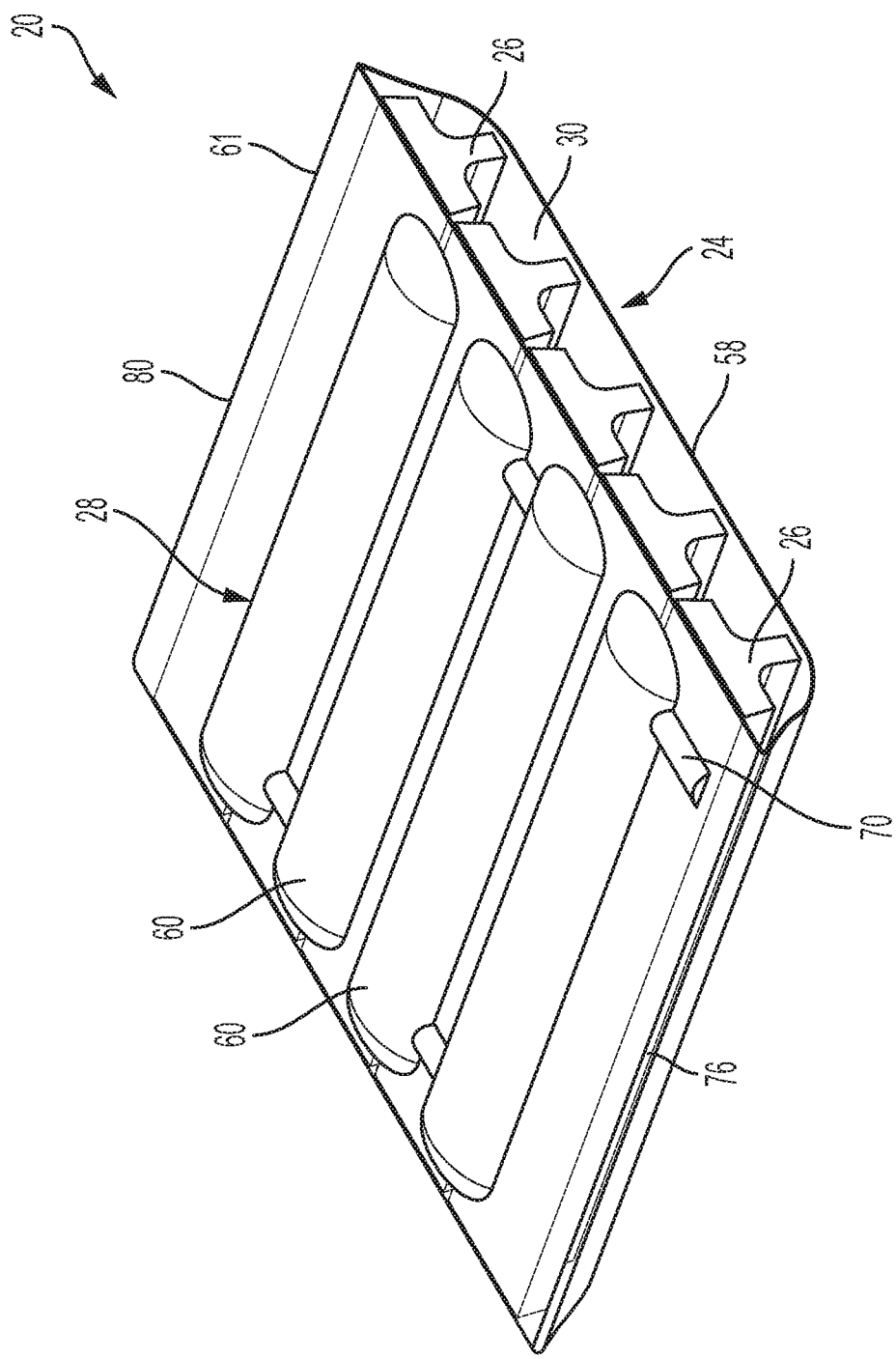
FIG. 4. is a cross-sectional perspective view of the pneumatic articulating structure similar to FIG. 2 but illustrating an opposite, second side.

Referring to FIGS. 3 and 4, the inflatable layer 28 of the articulating structure 20 includes, and/or defines, a plurality of air pockets 60. Each air pocket 60 may be elongated, and is aligned to (i.e., collinear with), a respective hinge 56. Furthermore, the layer 28 is attached to the second side 59 of the bladder 24 proximate to the hinges 56 and the surface 46 of each tile 26. In another embodiment, and where the bladder 24 consists only of the cover 58, the layer 28 is attached directly to the surfaces 68 of the tiles 26, and/or the hinges 56 that may be an integral part of the tiles 26 as previously described.

Figure 5:
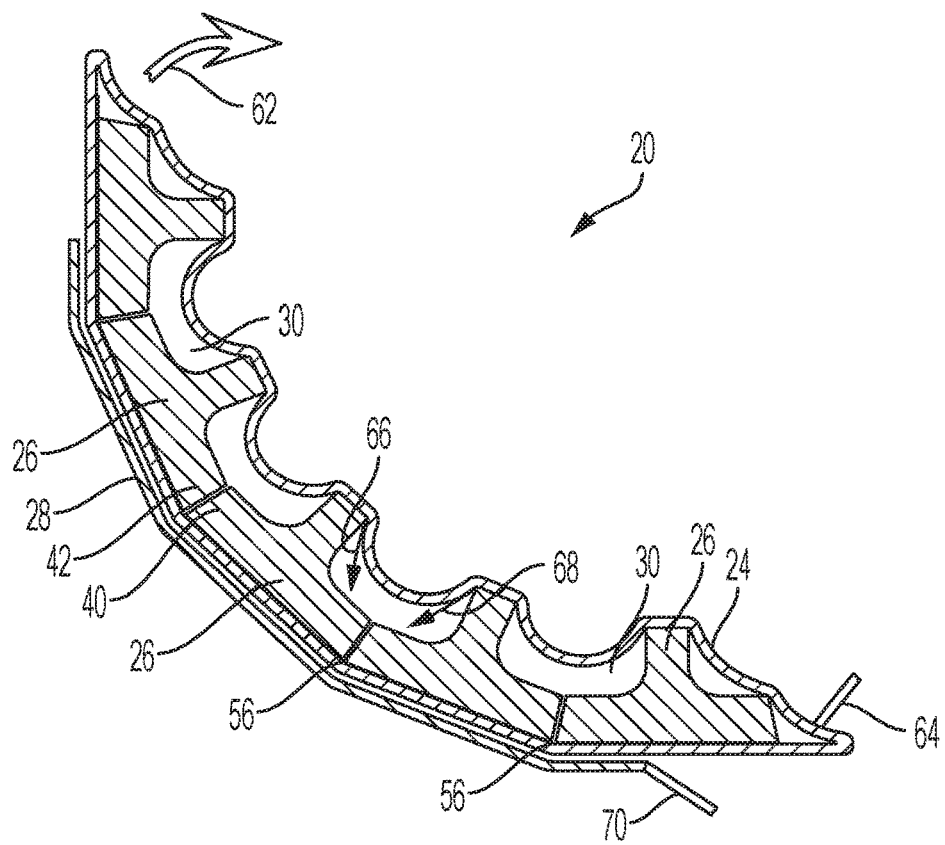
FIG. 5 is a cross section of the pneumatic articulating structure similar to FIG. 3 but illustrated in a flexed state.

In operation, the articulating structure 20 may include a relaxed state, a flexed state (i.e., or a curled state), and a biased state. When in the relaxed state, a vacuum is not applied to the vacuum chamber 30, and a positive air pressure is not applied to the air pockets 60 of the inflatable layer 28. In the present, non-limiting, example, the articulating structure 20 is substantially planar when in the relaxed state. As best shown in FIG. 5, and when flexing in an angular direction (see arrow 62) and toward the flexed state, a vacuum is being applied to the vacuum chamber 30 via an opening 64 (e.g., nozzle) in the bladder 24, and the air pockets 60 of the layer 28 (see FIG. 4) are fully deflated. That is, when the vacuum is applied, a tension is created in the cover 58 of the bladder 24 that produces moment forces (see arrows 66, 68) directed between respective end portions 38 of adjacent legs 32 and the associated hinge 56. The moment forces 66, 68 overcome any biasing force created by the resiliency of the hinges 56 causing the articulating structure 20 to flex. When fully flexed, opposing, chamfered, end portions 40, 42 of the tiles 26 may be in contact with one-another preventing further flexing, and undesired strain upon the resiliently flexible hinges 56.

To un-flex the articulating structure 20, the vacuum is removed from the vacuum chamber 30 via the opening 64, the moment forces 66, 68 are alleviated, and in one example, the resiliency of the flexible hinges 56 produces a biasing force that may return the articulating structure toward the relaxed state. To assist in this return, a positive air pressure may be added to the air pockets 60 via an opening 70 (e.g., nozzle). When the articulating structure 20 is un-flexing, tension in the air pockets 60 at least in-part biases the articulating structure 20 toward the relaxed state from the flexed state.

In some applications, and when the articulating structure is in the relaxed state, introduction of a positive air pressure in the air pockets 60 (or continued positive air pressure) can be used to dynamically exert a biasing force (see arrow 72 in FIG. 3) against an object to promote a seal and/or ensure a rigidity in the structure 20.

For example, and as best shown in FIGS. 1 and 3, the articulating structure 20 may be a wind cowling that covers windshield wiper blades 23 used on a front windshield 74 of vehicle 22. A forward edge portion 76 of the articulating structure 20 may be engaged to a hood 78 of the vehicle 22, and an opposite rearward edge portion 80 of the articulating structure 20 may be biased against (for example) the windshield 74 by the positive air pressure in the pockets 60 of the layer 70 (i.e., the biased state).

In other embodiments, the articulating structure 20 may not include the layer 28, and may function solely on the biasing force produced by the resiliency of the hinges 56.

Figure 6:
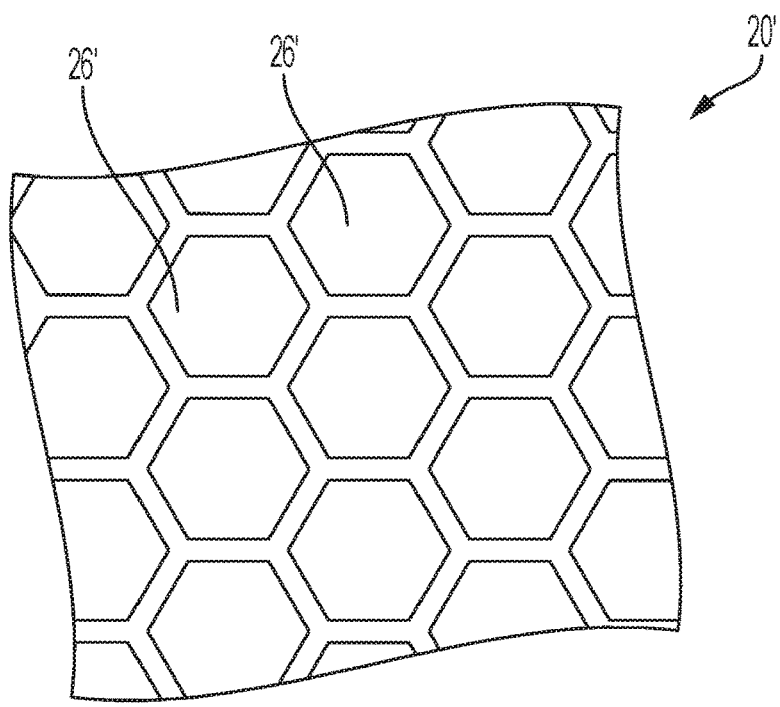
FIG. 6 is a partial view of a second embodiment of tiles of the pneumatic articulating structure.

Referring to FIG. 6, an embodiment of an articulating structure is illustrated wherein like elements have like identifying numerals except with the addition of a prime symbol suffix. In this embodiment, the articulating structure 20' includes a plurality of tiles 26' that are not elongated but instead comprise a mosaic pattern. For example, each tile 26' may be in the shape of a hexagon. In this example, the articulating structure 20' may be capable of two-dimensional movement, and not simply a one-dimensional curl as in the first embodiment.

Figure 7:
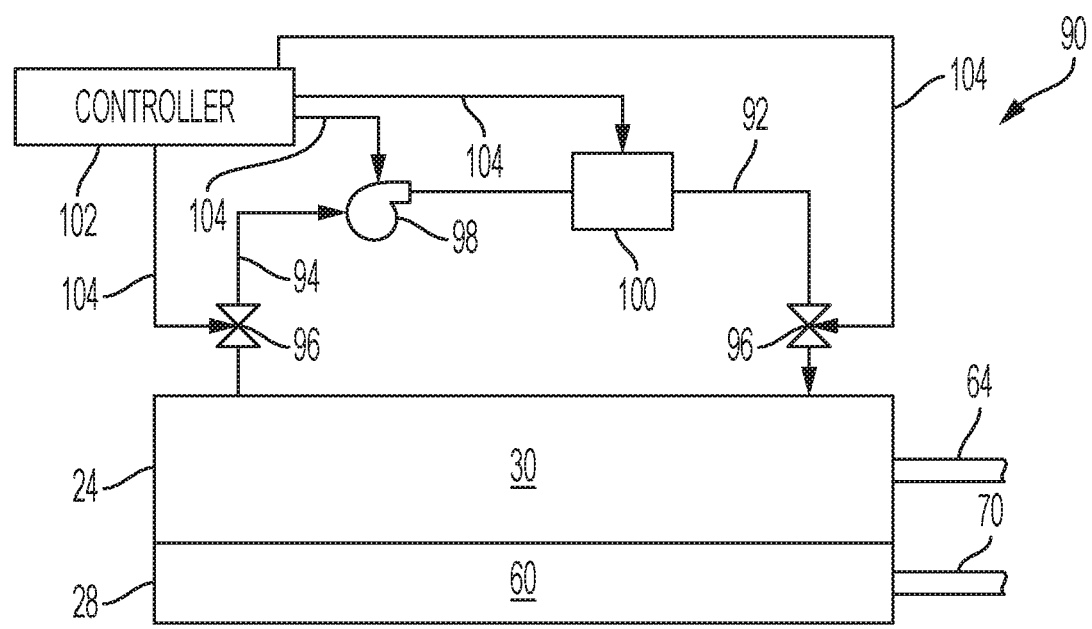
FIG. 7 is a schematic of a pneumatic articulating structure system that includes the pneumatic articulating structure.

Referring to FIG. 7, the articulating structure 20 may be part of an articulating structure system 90 adapted to control the temperature of the materials of the articulating structure 20 thereby maintaining desired flexibility. Moreover, the system 90 may facilitate a de-icing function. The system 90 may include an inlet conduit 92, and outlet conduit 94, an isolation valve arrangement 96, an air pump 98, a heater 100, and a controller 102.

In an embodiment, the system 90 may generally heat the articulating structure 20 prior to flexing of the structure. That is, the system 90 is capable of heating the articulating structure 20 prior to placing the chamber 30 under a vacuum as previously described. In one example, the system 90 is configured to draw air from the chamber 30 via the outlet conduit 94, pump and/or increase the air pressure via the air pump 98 (i.e., compressor), flow the pressurized air through the heater 100 to controllably heat the air, and then flow the heated air under a positive pressure back into the chamber 30.

The controller 102 may facilitate a time dependent operation, and/or a temperature dependent operation capable of receiving command and/or temperature signals from devices (e.g., temperature sensor) not specifically illustrated. Upon initiation of the heating operation, the controller 102 is configured to send various command signals (see arrows 104) to various components of the system. For example, the controller 102 may initiate the air pump 98, the heater 100, and the valve arrangement 96 (e.g., open at least one valve of the valve arrangement). When the heating operation is terminated via, for example, a preprogrammed time period expiration and/or a preprogrammed temperature threshold being reached, the controller 102 may close the valve arrangement 96, or otherwise isolate the conduits 94, 96. Once isolated, the system 90 may facilitate an operation that places the chamber 30 under a vacuum pressure as previously described. In another embodiment, the system 90 may not include a valve arrangement 96, and instead, the conduits 94, 96, the air pump 98, and the heater 100 may be placed under a vacuum when the chamber 30 is placed under a vacuum.

Advantages and benefits of the present disclosure include a robust and feasible structure capable of controlled flexing and/or articulation via the use of air pressure. The shape of the tiles may be altered to effect specific contouring, rolling, and/or bending capabilities. The structure is particularly adapted to close or open gaps upon command, and in some embodiments control material temperatures to promote flexibility and/or remove ice build-up.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A pneumatically actuated articulating structure comprising:
    a plurality of tiles, wherein each tile of the plurality of tiles has a first surface and a second surface facing in opposite outward directions, and an area of the first surface of at least a respective one of the plurality of tiles is greater than an area of the second surface of at least a respective one of the plurality of tiles;
    a flexible cover constructed to cover the plurality of tiles, wherein the second surface of each one of the plurality of tiles is attached to the flexible cover;
    a plurality of resiliently flexible hinges, each tile of the plurality of tiles being engaged to an adjacent tile by a respective resiliently flexible hinge of the plurality of resiliently flexible hinges, and being proximate to the first surface, wherein a vacuum chamber is define by at least the plurality of tiles and the flexible cover; and
    an inflatable layer proximate to, and engaged to, the first surfaces of the plurality of tiles.

2. The pneumatically actuated articulating structure set forth in claim 1, wherein the inflatable layer defines a plurality of air pockets constructed to receive positive are pressure, and wherein each air pocket is proximate to a respective hinge of the plurality of resiliently flexible hinges.

3. The pneumatically actuated articulating structure set forth in claim 2, wherein the plurality of tiles are biased toward a first direction upon application of a vacuum in the chamber, and are biased toward a substantially opposite second direction upon application of a positive pressure in the inflatable layer.

4. A pneumatically actuated articulating structure comprising:
a plurality of tiles, wherein each tile of the plurality of tiles has a first surface and a second surface facing in opposite outward directions, and an area of the first surface of at least a respective one of the plurality of tiles is greater than an area of the second surface of at least a respective one of the plurality of tiles;
a flexible cover constructed to cover the plurality of tiles, wherein the second surface of each one of the plurality of tiles is attached to the flexible cover; and
a plurality of resiliently flexible hinges, each tile of the plurality of tiles being engaged to an adjacent tile by a respective resiliently flexible hinge of the plurality of resiliently flexible hinges, and being proximate to the first surface, wherein a vacuum chamber is define by at least the plurality of tiles and the flexible cover, wherein each tile of the plurality of tiles have a T-shaped cross section including first, second, and third legs, wherein the first leg includes an portion that carries the second surface and the second and third legs carry the first surface, wherein the plurality of tiles are elongated and aligned side-by-side, wherein the first surface spans laterally between end portions of the respective second and third legs, and wherein the end portions of the first and second legs are chamfered toward the first leg.

5. The pneumatically actuated articulating structure set forth in claim 3, wherein the pneumatic articulating structure is a windshield cowling.

6. A pneumatic articulating structure comprising:
a plurality of tiles, wherein each tile of the plurality of tiles has a first surface and a second surface facing in opposite outward directions;
a flexible bladder including opposite first and second side walls defining a chamber, wherein the plurality of tiles are in the chamber, the first surfaces are attached to the first sidewall, and the second surfaces are attached to the second sidewall;
wherein the second sidewall includes a plurality of resiliently flexible hinges, each tile of the plurality of tiles being spaced from and engaged to an adjacent tile by a respective resiliently flexible hinge of the plurality of resiliently flexible hinges; and
an inflatable layer engaged to the second sidewall and adjacent to the plurality of resiliently flexible hinges, wherein the plurality of tiles are biased toward a first direction upon application of a vacuum in the chamber, and are biased toward a substantially opposite second direction upon application of a positive pressure in the inflatable layer.

7. A pneumatic articulating structure system comprising:
a plurality of tiles each having a first surface and a second surface facing in opposite outward directions;
a flexible bladder including opposite first and second side walls defining a chamber, wherein the plurality of tiles are in the chamber, the first surfaces are attached to the first sidewall, and the second surfaces are attached to the second sidewall;
wherein the second sidewall includes a plurality of resiliently flexible hinges, each tile of the plurality of tiles being spaced from and engaged to an adjacent tile by a respective resiliently flexible hinge of the plurality of resiliently flexible hinges;
a heater adapted to heat air; and
an air pump adapted to induce the flow of heated air at a positive pressure, and into the chamber when the chamber is not under vacuum.

8. The pneumatic articulating structure system as set forth in claim 7, further comprising:
an inflatable layer engaged to the second sidewall and adjacent to the plurality of resiliently flexible hinges; and
a controller configured to control the air pump and the heater.

* * * * *